(12) United States Patent
Iwagaki et al.

(10) Patent No.: US 6,707,999 B2
(45) Date of Patent: Mar. 16, 2004

(54) ELECTRONIC IMAGE TRANSMISSION SERVICE SYSTEM

(75) Inventors: Masaru Iwagaki, Tokyo (JP); Syoji Matsuzaka, Tokyo (JP)

(73) Assignee: Konica Corporation, Tokyo (JP)

( * ) Notice: Subject to any disclaimer, the term of this patent is extended or adjusted under 35 U.S.C. 154(b) by 222 days.

(21) Appl. No.: 09/819,381

(22) Filed: Mar. 28, 2001

(65) Prior Publication Data

US 2001/0052883 A1 Dec. 20, 2001

(30) Foreign Application Priority Data

Mar. 31, 2000 (JP) ........................................ 2000-098292

(51) Int. Cl.⁷ ........................ G03B 17/48; G03B 27/52; H04N 1/00
(52) U.S. Cl. ........................ 396/429; 355/40; 355/77; 358/487; 705/14
(58) Field of Search ............................ 355/18, 40, 77; 705/14, 26, 27; 385/305; 396/429, 310, 311; 358/506, 487, 527; 348/96

(56) References Cited

U.S. PATENT DOCUMENTS

| | | | |
|---|---|---|---|
| 5,760,916 A | * | 6/1998 | Dellert et al. ............... 358/408 |
| 5,760,917 A | * | 6/1998 | Sheridan ..................... 358/442 |
| 5,768,633 A | * | 6/1998 | Allen et al. ..................... 396/2 |
| 5,784,461 A | * | 7/1998 | Shaffer et al. ................. 705/51 |
| 5,799,219 A | * | 8/1998 | Moghadam et al. ......... 396/319 |
| 5,949,551 A | * | 9/1999 | Miller et al. ................. 358/408 |
| 6,017,157 A | * | 1/2000 | Garfinkle et al. ........... 396/639 |
| 6,222,646 B1 | * | 4/2001 | Maurinus et al. ........... 358/440 |
| 6,324,521 B1 | * | 11/2001 | Shiota et al. ................. 705/27 |
| 6,388,732 B1 | * | 5/2002 | Williams et al. .............. 355/40 |
| 2002/0067500 A1 | * | 6/2002 | Yokomizo et al. ......... 358/1.15 |

* cited by examiner

*Primary Examiner*—Alan Mathews
(74) *Attorney, Agent, or Firm*—Frishauf, Holtz, Goodman & Chick, P.C.

(57) ABSTRACT

A method for accomplishing an electronic image information transmitting service, comprising steps of: selecting by a second party whether or not to receive the electronic image information transmitting service; inputting by a first party with an inputting means information regarding the second party and a selection result by the second party in the selecting step; converting by the first party an image on a developed photographic film or on a developed photographic paper exposed based on the developed photographic film into electronic image information when the second party selects so as to receive the electronic image information transmitting service; accumulating the electronic image information converted by the first party in an accumulating means; and transmitting the electronic image information by a transmitting means through a communicating means to a reception destination designated by the second party.

2 Claims, 2 Drawing Sheets

ELECTRONIC IMAGE TRANSMISSION SERVICE SYSTEM

BACKGROUND OF THE INVENTION

The present invention relates to a service by which a development processed negative film, reversal film or print is converted into an electronic image and the electronic image is transmitted to a reception destination specified by the user.

Conventionally, the exposed photographic film of the user is developed and printed by a lab (developing laboratory) through a reception place, and a negative film and prints are delivered to the user.

There is a system in which the development processed negative film is read out by a scanner and formed into the electronic data and written into a CD, and delivered to the user.

Further, there exists a system by which the electronic image data read out by the scanner is exhibited on a specific site and the image data can be observed.

In the conventional simultaneous print system, the negative film and print can be obtained, however, when the electronic image is wanted, it is necessary that the reading apparatus is purchased by the person himself, or the request is made to the lab and the electronic image data is written into a medium such as the CD. In any of the methods, cost is required, and the operation to use the electronic image data is troublesome.

Further, when an interested person such as the friend, acquaintance, and relative of the user, wants to have the photographic print photographed by the user, it is necessary that the interested person asks the user to order the extra print, and it is troublesome.

Further, there may be considered a method of providing electronic image information, wherein the developing laboratory records the electronic image information for each customer in a web-site of an internet and transmits an address of the web-site to the customer and the customer views the electronic image information on the web-site at the address. However, in order to use the above method, since a person other than the customer can also view the electronic image information by inputting the address, it is necessary to make the address to be complicated or to use a complicated password in order to maintain appropriate security. As a result, it may become difficult to obtain the electronic image information easily.

SUMMARY OF THE INVENTION

An object of the present invention is to solve the above described problems, as achieved by the following methods and/or the following systems.

(1-1) A method for accomplishing an electronic image information transmitting service, comprises steps of:
selecting by a second party whether or not to receive the electronic image information transmitting service;
inputting by a first party with an inputting means information regarding the second party and a selection result by the second party in the selecting step;
converting by the first party an image on a developed photographic film or on a developed photographic paper exposed based on the developed photographic film into electronic image information when the second party selects so as to receive the electronic image information transmitting service;
accumulating the electronic image information converted by the first party in an accumulating means; and
transmitting the electronic image information by a transmitting means through a communicating means to a reception destination designated by the second party.

(1-2) In the method of (1-1), in the transmitting step for transmitting the electronic image information to the reception destination designated by the second party, the electronic image information is transmitted to the reception destination designated by the second party together with information regarding the electronic image information transmitting service.

(1-3) In the method of (1-1), in the transmitting step for transmitting the electronic image information to the reception destination designated by the second party, the electronic image information is transmitted to the reception destination designated by the second party together with additional information.

(1-4) In the method of (1-1), the electronic image information accumulated in the accumulating means is eliminated when the second party rejects to accumulate the electronic image information in the accumulating means or offers to eliminate the electronic image information from the accumulating means or when a time period for accumulating the electronic image information in the accumulating means exceeds a predetermined time period.

(1-5) In the method of (1-1), in the converting step for converting the image on the photographic film or on the photographic paper into the electronic image information, the image on the photographic film or on the photographic paper is discriminated by an image retrieving soft or an image discriminating soft, additional information is selected in accordance with the discriminated image on the photographic film or on the photographic paper, and the electronic image information is transmitted together with the selected additional information to the reception destination designated by the second party.

(1-6) In the method of (1-1), in the selecting step whether or not to receive the electronic image information transmitting service, a questionnaire is asked and additional information is selected in accordance with a response to the questionnaire, and the electronic image information is transmitted to the reception destination designated by the second party together with the selected additional information.

(1-7) In the method of (1-1), in the transmitting step for transmitting the electronic image information by the transmitting means to the reception destination designated by the second party, after the electronic image information is converted into small volume electronic image information, the small volume electronic image information is transmitted.

(1-8) In the method of (1-1), the first party is a developing laboratory and the second party is a user.

(1-9) An electronic image information transmitting system, comprises:
a converting means to convert an image on a developed photographic film or on a developed photographic paper exposed based on the developed photographic film into electronic image information;
a accumulating means to accumulate the electronic image information converted by the converting means;
a transmitting means to transmit the electronic image information to a receiving means through a communicating means;
a customer information inputting means to input the customer information; and a reception destination designated by a user to receive the electronic image information.

Further, the above object may be attained by the following method or the following systems.

(2-1) In an electronic image transmission service system having: a conversion means for converting an image from a development processed photographic film into an electronic image after the exposed photographic film is development processed, or an image of the print from the photographic film into an electronic image; an accumulation means for accumulating the electronic image converted by the conversion means; a transmission means for transmitting the electronic image to the user by using a communication means; and a user information input means, the user inputs the result in which the user selects whether he receives the electronic image transmission service, into the user information input means, and when the user receives the electronic image transmission service, the electronic image is transmitted to the reception destination specified by the user.

(2-2) The electronic image transmission service system described in (2-1), wherein, when the electronic image is transmitted to the reception destination specified by the user, the information relating to the electronic image transmission service is added.

(2-3) The electronic image transmission service system described in any one of (2-1) or (2-2), wherein, when the electronic image is transmitted to the reception destination specified by the user, the additional information is added.

(2-4) The electronic image transmission service system described in any one of (2-1) to (2-3), wherein, when a requirement to refuse or to cancel the accumulation of the electronic image is received, or when an arbitrarily predetermined time has passed, the electronic image accumulated in the accumulation means is erased.

(2-5) In an electronic image transmission service system having: a conversion means for converting an image from a development processed photographic film into an electronic image after the exposed photographic film is development processed, or an image of the print from the photographic film into an electronic image; an accumulation means for accumulating the electronic image converted by the conversion means; a transmission means for transmitting the electronic image to the user by using a communication means; and a user information input means, when an image from a development processed photographic film, or the image of the print from the photographic film is converted into the electronic image, an image from the photographic film or the image of the print from the photographic film is recognized by using an image search or image recognition software, and the additional information is selected corresponding to the recognized image from the photographic film or the image of print from the photographic film, and the electronic image information and the selected additional information are transmitted to the reception destination specified by the user.

DETAILED DESCRIPTION OF THE PREFERRED EMBODIMENT

Method for accomplishing an electronic image transmission service and an electronic image transmission service system of the present invention will be detailed below.

Figure 1:
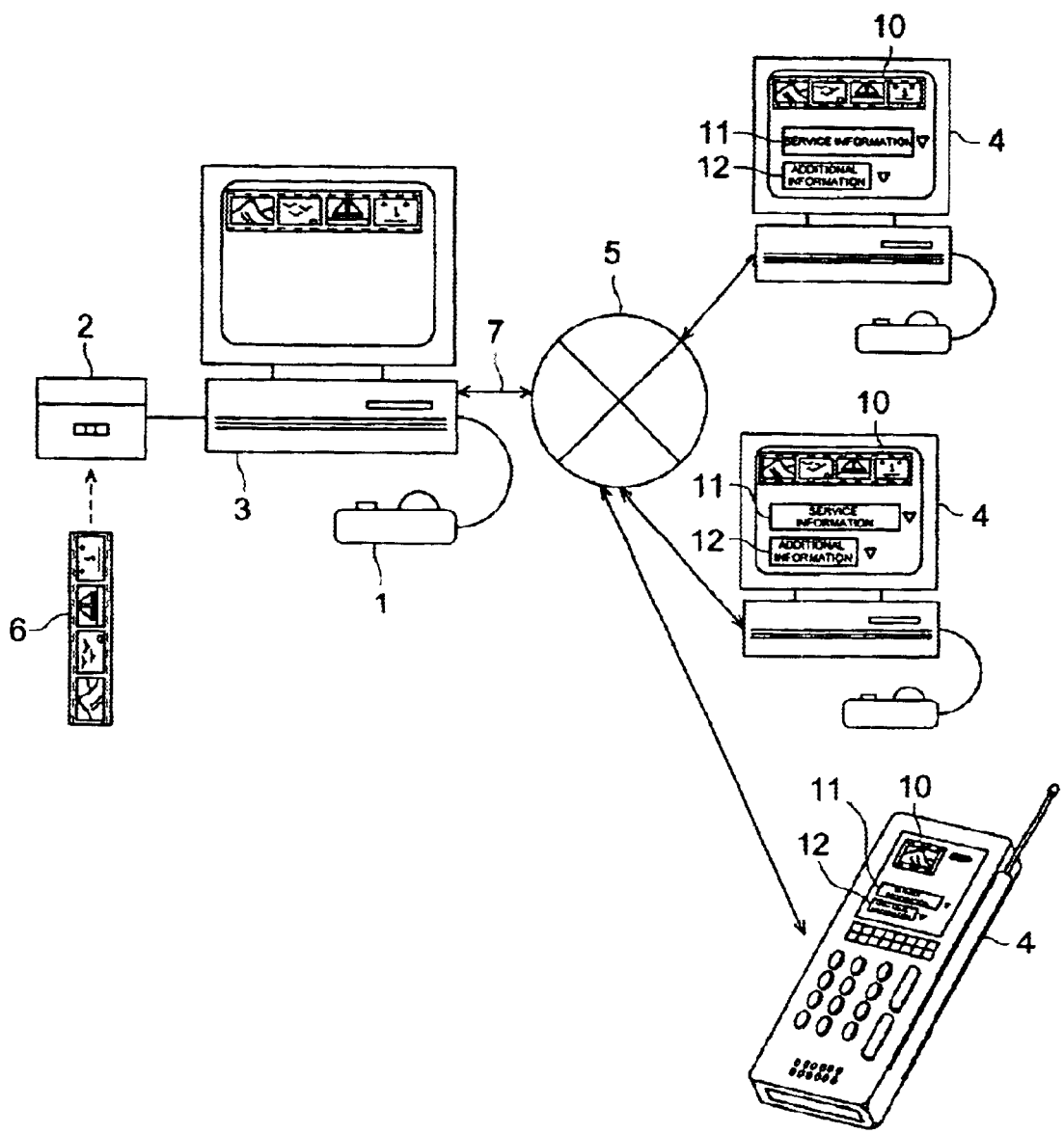
FIG. 1 is a conceptual view of an electronic image transmission service system.

FIG. 1 is an outline of the electronic image transmission service system in the present invention.

In the present invention, a first party means a store or an organization which has a facility capable of developing a photographic film or a photographic paper such as a developing laboratory. On the other hand, a second party means a user such as a photographer. The user may be an individual (a person) or a party such as a company.

When the request of the development processing is received from the user, the address, name, and destination to make contact, received from the user are inputted by the input means 1. In this case, the result in which it is selected by the user whether the electronic image transmission service is received, is also inputted into the input means 1. When the user receives the electronic image transmission service, the user specifies the reception destination of the electronic image. The specified reception destination is inputted into the input means 1.

When the user selects to receive the electronic image transmission service, an image from the development processed photographic film or an image of a print 6 from the film, is converted into the electronic image by using the conversion means 2.

The converted electronic image is accumulated in an accumulation means 3. The accumulated electronic image is transmitted to a reception destination 4 specified by the user by a transmission means 7 through a communication means 5.

Figure 2:
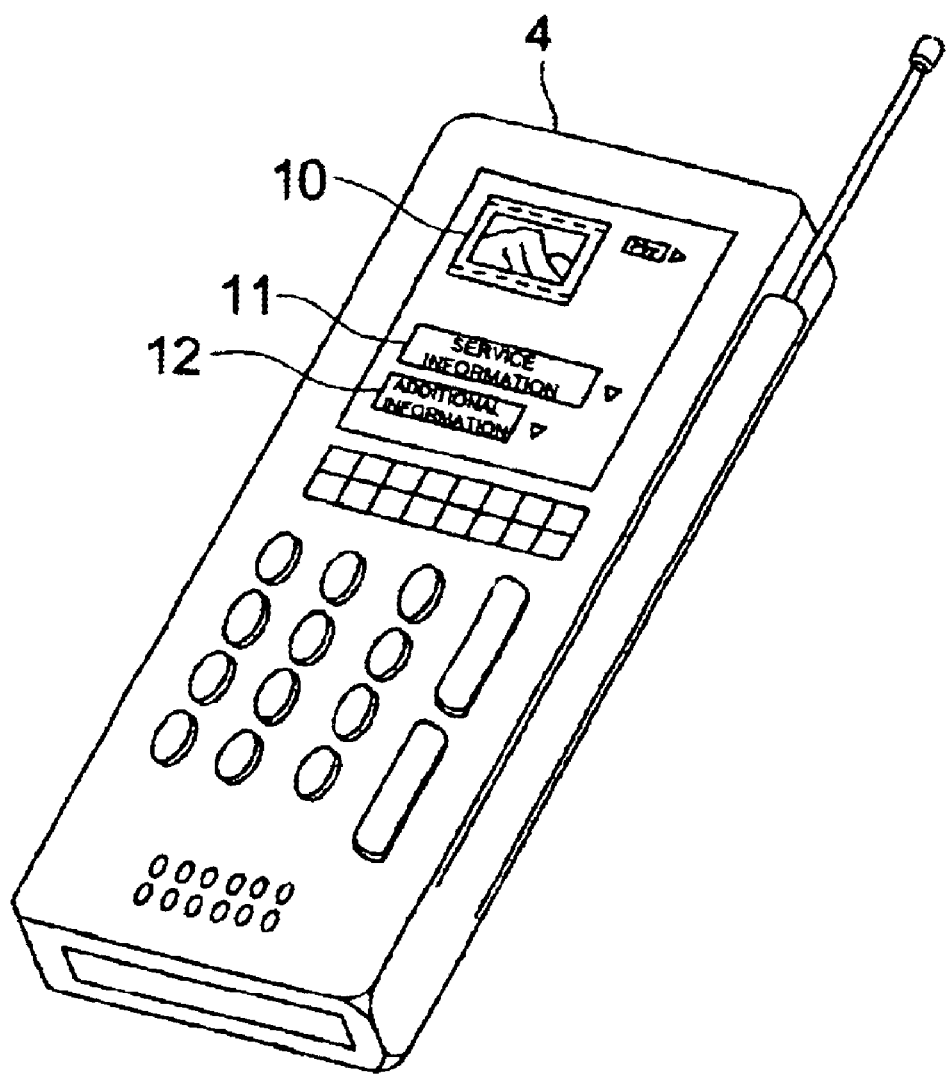
FIG. 2 is an example in which the user receives the individually transmitted electronic images.

The electronic image to be transmitted is transmitted as an index system as shown in FIG. 1, or for each image as shown in FIG. 2.

In the present invention, the development processing may also be a generally conducted color development processing or monochromatic development processing, or a development processing in which a part of the processes according to the development processing such as a bleaching process, a fixing process, or a drying process, in the processes of the development processing, is omitted.

In the present invention, a means for converting an image from the development processed photographic film or an image of a print from the photographic film into the electronic image is not particularly limited when the conversion means is a means by which the image from the development processed photographic film or the image of a print from the photographic film can be converted into the electronic image, and specifically, a means by which the image from photographic film or an image of a print from the photographic film is read by a scanner, and the image is converted into the electronic image, is preferably used.

In the present invention, as the accumulation means for accumulating the electronic image, any of a recording medium such as a server on the network, hard disk of the personal computer, magnetic disk, or optical disk, may be allowable, and it is particularly preferable to use the server on the network.

In the present invention, as the communication means, any one of a communication using a wireless communication, satellite communication, optical communication, or communication using telephone line, and a communication using a cable television line may be used.

In the present invention, the transmission means may be a means having a means which can transmit the image data to a reception destination specified by a user, and for example, a mail software of a personal computer corresponds to this.

In the present invention, the user information input means may be a terminal equipment by which the user information can be inputted at the time of the order reception at the shop or collection place.

As specific input operations, when the user makes a request for the development processing of the exposed photographic film, he selects whether he would like to also receive the electronic image transmission service, and the person in the shop or collection place inputs the selection result and the user information (for example, address, name, telephone number, electronic mail address, etc.) by the input means. Further, it is preferable that the user information once inputted by the input means is accumulated, at the time of a second or subsequent visit to the shop, because the address and name are already stored, the operation to again input the information can be omitted.

When the user selects to receive the electronic image transmission service, the electronic image is transmitted to the reception destination specified by the user. The reception destination specified by the user may be a single location or a plurality of locations. The reception destination may be a computer terminal equipment of the user's home, computer terminal equipment of the user's place of employment, or computer terminal equipment of the acquaintance, friend, or relatives, further, a portable telephone by which the electronic image can be received, mobile terminal equipment, and when it is an equipment by which the electronic image can be received, it is not particularly limited.

The received exposed photographic film is development processed, and when the user desires to receive the electronic image transmission service, the image from the photographic film, or an image of the print from the photographic film is further read by the scanner, and converted into the electronic image and accumulated in the accumulation means.

The accumulated electronic image is transmitted to the reception destination specified by the user by the transmission means according to the inputted user information. The transmitted electronic image may be either one of a so-called index system (refer to FIG. 1), in which, when it is received and viewed, a plurality of images are displayed on an image plane, or a system in which the electronic image is individually transmitted one sheet by one sheet (refer to FIG. 2). When the reception destination specified by the user has a large image plane as in the case of a personal computer, the index system is preferable, and when the image plane is small as in the case of a portable telephone by which the image can be received, the system in which the image is individually transmitted is preferable. The user can select the transmission system.

The electronic image information to be transmitted to the user (customer) may be identical to the electronic image information stored in the accumulation means 3. However, it may be preferable that the electronic image information to be transmitted to the user is electronic image information converted into a small volume to an extent capable of confirming the image from the view point of transmission speed. Also, it may be preferable to select the converted volume of the electronic image information in accordance with the request of the user. Further, it may be possible to improve the transmission speed by transmitting the electronic image information after compressing the electronic image information.

When the electronic image is transmitted to the reception destination specified by the user, as the information other than the electronic image, the information relating to the electronic image transmission service can be simultaneously transmitted.

As the information relating to the electronic image transmission service, there are the dimension of the electronic image (for example, image capacity (bytes)), the system of the electronic image (for example, JPG, TIFF, JIFF, BMP, PSD, etc.), the charge of the electronic image transmission service, order charge of the extra print, the ordering method of the extra print, the specification of the print of the extra print (for example, print size, image quality of the print, special print such as the sepia toning, seal print, calendar type, etc.), or an order tablet. As the order tablet, a tablet in which the customer information is previously inputted, can be transmitted. When the customer information is previously inputted in the order tablet, there is an advantage in which another certification is not necessary when the user only confirms the information previously recorded in the order tablet. Thereby, in the conventional certification in the Internet, the very troublesome operation such as the input of the ID cord or pass word is not necessary, accordingly, when the user places an order by the order tablet, it is not necessary to write the troublesome customer information, and the user can place the order simply.

The information other than the image information may be transmitted as another mail sentence separated from the electronic image in the electronic image transmission, or may be attached to the index system electronic image, or may be attached to individual electronic image.

Further, other than the information relating to the electronic image transmission service, the additional information can be attached. As the additional information, for example, an industrial advertisement, or the event information can be listed.

In the present invention, when the additional information is attached, by attaching the industrial advertisement or event information, corresponding to the content of the image photographed by the user and/or corresponding to the user information, the effect of the industrial advertisement is increased, or the event information is also effectively used, and it is preferable.

As a method to enclose additional information in accordance with the user information, asking a questionnaire is conducted when an order for developing processing is received from the user and the additional information may be selected in accordance with the response to the questionnaire. It may be preferable that the form of the questionnaire is to response to a simple questionnaire regarding a hobby or an interesting event.

The recognition of the content of the image photographed by the user can be easily carried out when the image from the exposed photographic film or the image of the print from the photographic film is read by the scanner, by using the image search or image recognition software, and it is preferable that, corresponding to the content of the recognized film, preferably or further adding the user information, the industrial advertisement or event information can be automatically selected.

For example, when the content photographed by the user is recognized that there are many things relating to fishing, as the industrial advertisement, the advertisement relating to the fishing or advertisement relating to the out-door goods is selected. Further, as the event information, the information of a fishing meeting, or fishing spots, fishing boat information are selected. In this case, it is preferable that, for example, corresponding to the address of the user, the information of the neighborhood areas of the address is selected.

As a means for searching the image or recognizing the image, the commonly known means can be used.

Specifically, for example, Japanese Tokkaihei-7-65169, Tokkaihei-11-238077, and Tokkaihei-11-238078, are listed.

In the present invention, the accumulated electronic image can be erased when the request of the accumulation erasing from the user is received. Alternatively, it can be automatically erased when an arbitrarily predetermined period has passed. In this connection, before the arbitrarily predetermined period has expired, it is preferable to confirm the user whether the accumulated electronic image is erased or continuously accumulated. The means for confirmation is not particularly limited, however, it is simple and preferable that, in the computer, the period can be controlled, and the confirmation is automatically transmitted to the reception destination specified by the user by the communication means.

The electronic image transmission service of the present invention may be charged on the user, however, the effect of the user collection can be increased when it is free of charge, which is preferable.

Further, when the additional information is attached to the electronic image transmission, because the publishing charge form the advertiser or event promoter can be obtained, the electronic image transmission service for the user can be made free of charge. The publishing charge may be a fixed rate, or may be accounted corresponding to the number of times of the reading of the industrial advertisement or event information. In the case where the additional information is attached for each of individual image, when the user transmits the electronic image to the friend, acquaintance, relatives, or the additional information is attached to the electronic mail, because the number of times of the reading of the additional information can be increased, the accounting method corresponding to the number of times of the reading is effective and preferable.

The development processed photographic film, the print from the photographic film are returned to the user at the shop, or can be delivered to the place specified by the user by means of mail or parcel delivery service, or can be delivered to a convenience store specified by the user.

According to the service of the present invention, by transmitting the electronic image to the terminal equipment desired by the user, the user can easily obtain the electronic image, and can effectively use the image which is converted into the electronic image, not through the troublesome process such as a process of conversion into the electronic image by the use of digital camera, or the scanner. Further, the service such as the extra print order can be easily received also in a friend, acquaintance, or relatives, not to mention in the user himself.

Further, by the use of the user information, because the wide service in which the additional information such as the industrial advertisement, or event information can be presented to the user, can be available, the increase of the earnings can be intended. Accordingly, the electronic image transmission service can be conducted in the free of charge for the used.

In this connection, in FIG. 1 and FIG. 2, numeral 10 is an electronic image, numeral 11 is a column of the information relating to the electronic image transmission service, and numeral 12 shows a display of the column of the additional information.

What is claimed is:

1. A method for achieving an electronic image data transmitting service through a communication system, comprising:

receiving a request from a customer at a shop together with a recoding medium having an image and an address of a receiver to which electronic image data are to be transmitted in response to the request;

inputting the address of the receiver;

converting the image of the recording medium into electronic image data, and storing the electronic image data in a memory;

discriminating a kind of the image from the image data;

selecting a specific kind of additional information in accordance with the discriminated kind of the image; and transmitting the electronic image data together with the specific kind of additional information to the address of the receiver by a transmitting device through the communication system.

2. The method of claim 1, wherein the specific kind of additional information includes at least one of advertisement information and event information.

* * * * *